March 31, 1964     H. E. BRENT     3,126,619
METHODS OF MAKING IMPROVED SOLDERED CONNECTIONS
Filed April 1, 1960

INVENTOR.
H. E. BRENT
BY
Don P. Bush
ATTORNEY

United States Patent Office

3,126,619
Patented Mar. 31, 1964

3,126,619
METHODS OF MAKING IMPROVED SOLDERED
CONNECTIONS
Herbert E. Brent, Baltimore, Md., assignor to Western
Electric Company, Incorporated, New York, N.Y., a
corporation of New York
Filed Apr. 1, 1960, Ser. No. 19,351
6 Claims. (Cl. 29—155.55)

The present invention relates to new and improved methods of making soldered connections. The invention relates more particularly, although not exclusively, to soldered electrical connections formed by soldering the end of a thermoplastic insulated conductor directly to a terminal without stripping or removing the thermoplastic insulation from the end thereof prior to the soldering operation.

In the past, it has been customary when soldering insulated conductors to terminals of electrical equipment to perform a number of costly and time-consuming preparatory operations such as stripping or otherwise removing the insulation from the portion of the end of the conductor to be soldered and then cleaning, pretinning or treating the exposed end in some manner.

When the terminals are relatively close to each other and are readily deformable, it has been found necessary in some instances to provide some type of insulating barrier means to prevent adjacent terminals from coming accidentally into electrical contact with each other during subsequent usage in the field. This has been accomplished in the past by installing insulating sleeves over the soldered connections or by placing insulating material between adjacent terminals.

In order to reduce the time and number of operations used previously for preparing and soldering thermoplastic insulated conductors to electrical terminals and thus reduce the cost thereof, it has been found that by soldering the end of the thermoplastic insulated conductor directly to the terminal without having previously stripped or removed the plastic insulation from the end of the conductor, the end of the conductors need not be cleaned or treated in any other manner prior to the soldering operation. Also, the need for providing additional means for preventing the adjacent terminals from coming accidentally in electrical contact with each other has been eliminated.

An object of the present invention is to provide new and improved methods of making soldered connections.

Another object of the present invention is to provide new and improved methods of soldering the ends of thermoplastic insulated electrical conductors directly to electrical terminals without the necessity of previously removing the thermoplastic insulation from the ends of the conductors.

A further object of the present invention is to provide soldered connections between the ends of thermoplastic insulated conductors and electrical terminals which have annularly projecting collars formed integrally of the thermoplastic insulation adjacent to the ends of the terminals to prevent adjacent terminals from coming accidentally into electrical contact with each other.

A method of soldering an end portion of a thermoplastic insulated conductor to a metal terminal embodying certain principles of the present invention may include placing solder on the surface of a terminal, onto which an end portion of a thermoplastic insulated conductor is to be soldered, and heating the holder and the terminal to at least the eutectic temperature of the solder. The insulated conductor is slid axially with respect to the terminal while the end of the thermoplastic insulation is held against an edge of the terminal and the conductive core of the conductor is held against the surface of the terminal onto which the solder was placed.

In this manner, the heat from the solder and terminal softens the thermoplastic insulation and the relative sliding movement between the conductor and the terminal results in forces which urge the end of the thermoplastic insulation on the conductive core to recede from the end of the conductive core. The end portion of the conductive core is exposed and is inserted directly into the solder to form a soldered connection between the end portion of the conductive core and the terminal. Also, a compressed, radially projecting, annular, insulating barrier is formed adjacent to the end of the terminal on the end portion of the insulation.

Other objects and advantages of the present invention will be more readily understood from the following detailed description of specific embodiments thereof, when read in conjunction with the accompanying drawings, in which.

Figure 1:
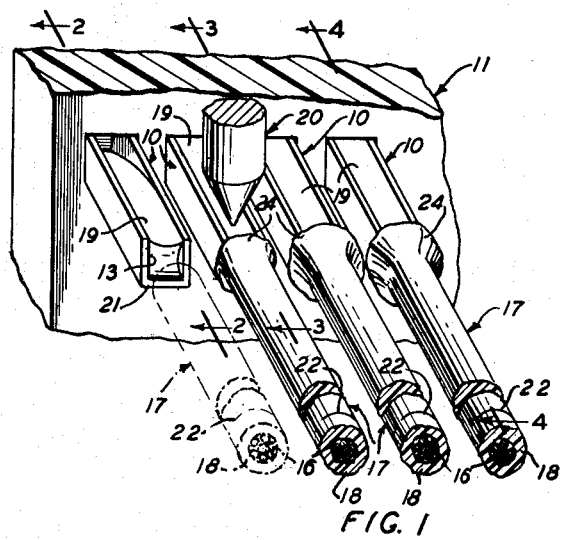
FIG. 1 is a perspective view of several soldered electrical connections embodying certain principles of the present invention shown in various stages of the soldering methods embodying certain principles of the present invention.
Figure 2:
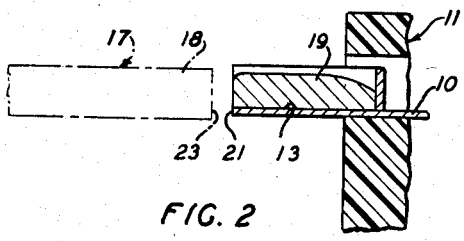
FIG. 2 is a sectional view of a terminal and an insulated conductor just prior to being soldered together, taken along line 2—2 of FIG. 1.
Figure 3:
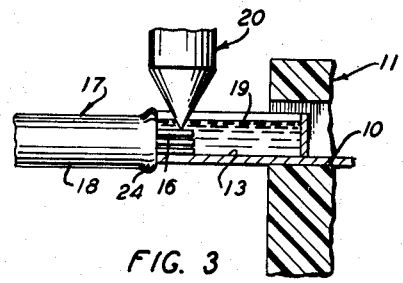
FIG. 3 is a sectional view of an initial stage of the formation of a soldered electrical connection of FIG. 1, taken along line 3—3 thereof.
Figure 4:
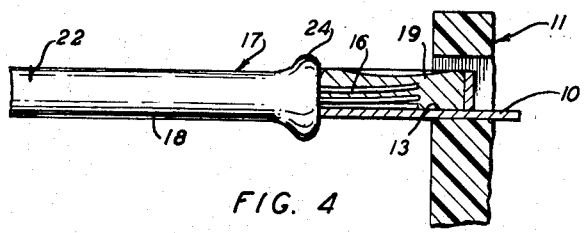
FIG. 4 is a sectional view of a completed electrical connection, taken along line 4—4 of FIG. 1.

Referring now to the drawings, and more particularly to FIG. 1 thereof, there is illustrated a plurality of "U-type" terminals, designated generally by the numerals 10—10, which project outwardly of an electrical element, such as a plug, designated generally by the numeral 11. The terminals 10—10, each have a substantially U-shaped concavity 13 formed therein. The width of the concavity 13 is preferably larger than the outside diameter of a conductive core 16 of a thermoplastic insulated conductor, designated generally by the numeral 17, to be soldered to the terminal 10, but smaller than the outside diameter of a tubular sheath of thermoplastic insulation 18 on the conductive core 16.

In the specific example, the concavities 13—13 in the terminals 10—10 are approximately 0.033 inch wide, approximately 0.045 inch deep and approximately 0.187 inch long. The wall thickness is approximately 0.006 inch. The specific conductive core 16 consists of seven parallel nontwisted strands of No. 35 A.W.G. (0.0056); grade 1, tinned, annealed copper, which is substantially equivalent in conductivity to a 27 gauge, annealed copper conductor. The outside diameter of the conductive core 16 is approximately 0.018 inch and the minimum wall thickness of the insulation 18 is approximately 0.010 inch. The specific insulation 18 is polyvinyl chloride made from type Geon 6461 compound manufactured by B. F. Goodrich Company, Cleveland, Ohio.

In prepartion for the formation of each soldered electrical connection, a pool of molten solder 19 is placed in each of the concavities 13—13 formed by each of the U-type terminals 10—10. The solder 19 is preferably rosin core solder containing substantially 60 percent tin and 40 percent lead and having an eutectic point of approximately 368° F. However, the solder 19 could be any one of many different types of solder well known in the art. The pool of solder 19 may be applied in any of many well-known ways, but is preferably applied by taking a strip of the solder 19 and melting a portion thereof with a pencil-like soldering iron, only the tip of which is illustrated in the drawings and is designated by the numeral 20. The solder 19 and terminal 10 are heated to a relatively high temperature, between 400° F. and 500° F.

A thermoplastic insulated conductor 17, without having the thermoplastic insulation 18 stripped from the end of the core 16 thereof, is positioned adjacent to the end 21 of the substantially U-shaped electrical terminal 10. A guide mark 22 is placed on the insulation 18 of the conductor 17, a predetermined distance (e.g. approximately ½ inch) from the end 23 of the thermoplastic insulation 18 with ink or other appropriate material which will not have an adverse effect on the thermoplastic insulation 18.

The end 23 of the thermoplastic insulation 18 of the conductor 17 is held against the end 21 of the terminal 10 as force is applied by an operator to the conductor adjacent to the end thereof. When the insulated conductor 17 is pushed axially thereof by the operator and longitudinally of the associated terminal 10, the end of the insulation 18 thereof is pushed against the end 21 of the terminal 10. The heat from the pool of molten solder 19 and the tip of the soldering iron 20, and the forces exerted on the insulation 18 as the end thereof is pushed against the end 21 of the terminal 10 will cause the insulation 18 to shrink back on or move longitudinally of the conductive core 16 and form a compressed, radially projecting, annular insulating barrier 24 on the end portion of the insulation 18.

As the thermoplastic insulation 18 shrinks back and is slid on the conductive core 16, a clean, uncontaminated surface of the end portion of the conductive core 16 is exposed and is inserted directly into the terminal 10 and the pool of solder 19 until the mark 22 is a predetermined distance (e.g. approximately ⅜ inch) from the end of the terminal 10. This insures that the end of the conductive core 16 will extend into the pool of solder 19 a distance (e.g. approximately ⅛ inch) which is sufficient to provide a soldered connection having a pull strength in excess of a predetermined, specified minimum of five pounds when the conductor 17 is secured to the terminal 10 by subsequent cooling of the solder 19.

It has been found highly advantageous to place the tip of the soldering iron 20 directly into the pool of solder to maintain the temperature of the terminal and solder at a predetermined temperature. Also, it has been found advantageous to place the tip of the soldering iron against the exposed end of the conductive core 16 extending into the pool of solder 19 to increase the rate of conduction of the heat from the tip of the soldering iron 20 to the conductive core 16, and, thus, the rate of softening of the thermoplastic insulation 18 and the shrink-back thereof on the conductive core 16. If desirable, the surface of the pool of solder 19 may be wiped toward the end of the terminal 10 with the tip of the soldering iron 20 to remove any foreign particles of insulation 18 which may have been carried into the pool of solder 19 during the soldering operation. The insulated conductor 17 should be supported until the pool of solder 19 solidifies sufficiently to form the soldered connection.

The soldered connections formed in the manner of the example have been found to have an average contact resistance of approximately 0.0487 ohm as compared to approximately 0.0438 ohm for conventional soldered connections. However, it should be noted that soldered connections made in accordance with the present invention have been found to be more uniform in contact resistance than those made by conventional methods. The average breaking strength of soldered connections made in accordance with the present example is approximately 8 pounds, as compared to approximately 7.5 pounds for soldered connections made by conventional methods.

By utilizing methods embodying principles of the present invention, the necessity of stripping the insulation 18 from and cleaning or treating the ends of the conductive cores 16—16 of the conductors 17—17 is eliminated. Also, compressed annular projecting portions 24—24 are formed on the ends 23—23 of the tubular sheaths of thermoplastic insulaton 18, which eliminates the need for insulated sleeves or some other means (not shown) to be provided to prevent accidental shorting of adjacent terminals.

It will be understood that the chemical nature of the solder and thermoplastic insulation is in no way critical. However, it should be noted that the term "thermoplastic insulation," as employed in the descriptive portion of the specification and appended claims, is meant to include any thermoplastic insulating material, such as polyethylene, polyvinyl chloride compounds, and the like which has a softening point which is below the eutectic temperature of the solder utilized in forming soldered connections in accordance with the present invention. The types of thermoplastic materials and solders used should be selected so that the eutectic temperature of the solder is low enough so that heat from the solder does not cause substantial heat degradation of the particular thermoplastic material used during the relatively short soldering period.

It should also be understood that the conductive core of the insulated conductor may be tinned or untinned and may be solid or stranded. If the conductive core is stranded, the strands making up the core may be twisted or nontwisted.

It is to be understood that the above-described arrangements are simply illustrative of the principles of the invention. Other arrangements may be devised by those skilled in the art which will embody the principles of the invention and fall within the spirit and scope thereof.

What is claimed is:

1. The method of soldering an end portion of a thermoplastic insulated conductor to a metal terminal, which comprises the steps of placing metal solder on the surface of a terminal onto which an end portion of a thermoplastic insulated conductor is to be soldered, heating the solder and the terminal to at least the eutectic temperature of the solder, and causing relative axial sliding movement of the insulated conductor with respect to the terminal while simultaneously holding the end of the thermoplastic insulation against an edge of the terminal and holding the conductor against the surface of the terminal onto which the solder was placed so that heat from the solder and terminal softens the thermoplastic insulation and the relative sliding movement between the conductor and the terminal results in forces which urge the end of the thermoplastic insulation on the conductor to recede from the end of the conductor to expose the surface of the end portion of the conductor as the exposed end portion of the conductor is inserted into the solder to form a soldered connection between the end portion of the conductor and the terminal, whereby an enlarged, compressed, radially projecting, annular insulating barrier is formed in the end portion of the insulation.

2. The method of soldering an end portion of a thermoplastic insulated conductor to a metal terminal, which comprises the steps of placing metal solder on the surface of a terminal onto which an end portion of a thermoplastic insulated conductor is to be soldered, heating the solder and the terminal to at least the eutectic temperature of the solder, placing a mark on the insulation of the conductor a predetermined distance from the end thereof, and causing relative sliding axial movement of the insulated conductor with respect to the terminal while simultaneously holding the end of the thermoplastic insulation against an edge of the terminal and holding the conductor against the surface of the terminal onto which the solder was placed so that heat from the solder and terminal softens the thermoplastic insulation and the relative sliding movement between the conductor and the terminal results in forces which urge the end of the thermoplastic insulation on the conductor to recede from the end of the conductor to expose the surface of the end portion of the conductor as the exposed end portion of the conductor is inserted into the solder until the mark on the insulation is a predetermined distance from the end of the terminal to form a soldered connection between the end portion of the conductor and the terminal, whereby an enlarged, compressed, radially projecting, annular insulating barrier is formed in the end portion of the insulation.

3. The method of soldering an end portion of a thermoplastic insulated conductor to a metal terminal, which comprises the steps of placing metal solder into a concavity in the terminal onto which an end portion of a thermoplastic insulated conductor is to be soldered, heating the solder and the terminal to at least the eutectic temperature of the solder, and causing relative sliding axial movement of the insulated conductor into the concavity of the terminal while simultaneously holding the end of the thermoplastic insulation against the edge of the terminal and holding the conductor against the surface of the concavity into which the solder was placed so that heat from the solder and terminal softens the thermoplastic insulation and the relative sliding movement between the conductor and the end of the terminal results in forces which urge the end of the thermoplastic insulation on the conductor to recede from the end of the conductor to expose the surface of the end portion of the conductor as the exposed end portion of the conductor is inserted into the solder in the concavity to form a soldered connection between the end portion of the conductor and the terminal, whereby an enlarged, compressed, radially projecting, annular insulating barrier is formed in the end portion of the insulation.

4. The method of soldering an end portion of a thermoplastic insulated conductor to a metal terminal, which comprises the steps of placing a pool of metal solder into a concavity in the terminal onto which an end portion of a thermoplastic insulated conductor is to be soldered, heating the solder and the terminal to at least the eutectic temperature of the solder, placing a mark on the insulation of the conductor a predetermined distance from the end thereof, and causing relative sliding axial movement of the insulated conductor into the concavity of the terminal while simultaneously holding the end of the thermoplastic insulation against the edge of the terminal and holding the conductor against the surface of the concavity into which the pool of solder was placed so that heat from the pool of solder and terminal softens the thermoplastic insulation and the relative sliding movement between the conductor and the end of the terminal results in forces which urge the end of the thermoplastic insulation on the conductor to recede from the end of the conductor to expose the surface of the end portion of the conductor as the exposed end portion of the conductor is inserted into the pool of solder in the concavity until the mark on the insulation is a predetermined distance from the end of the terminal to form a soldered connection between the end portion of the conductor and the terminal, whereby an enlarged, compressed, radially projecting, annular insulating barrier is formed in the end portion of the insulation.

5. The method of soldering an end portion of a thermoplastic insulated conductor to a metal terminal, which comprises the steps of placing a pool of metal solder into a concavity in the terminal onto which an end portion of a thermoplastic insulated conductor is to be soldered, heating the solder and the terminal to at least the eutectic temperature of the solder, placing a mark on the insulation of the conductor a predetermined distance from the end thereof, causing relative sliding axial movement of the insulated conductor into the concavity of the terminal while simultaneously holding the end of the thermoplastic insulation against the edge of the terminal and holding the conductor against the surface of the concavity into which the pool of solder was placed so that heat from the pool of solder and terminal softens the thermoplastic insulation and the relative sliding movement between the conductor and the end of the terminal results in forces which urge the end of the thermoplastic insulation on the conductor to recede from the end of the conductor to expose the surface of the end portion of the conductor as the exposed end portion of the conductor is inserted into the pool of solder in the concavity until the mark on the insulation is a predetermined distance from the end of the terminal to form a soldered connection between the end portion of the conductor and the terminal, whereby an enlarged, compressed, radially projecting, annular insulating barrier is formed in the end portion of the insulation, and wiping the surface of the pool of solder toward the end of the terminal to remove any foreign particles of insulation from the pool of solder.

6. The method of soldering an end portion of a thermoplastic insulated conductor to a metal terminal, which comprises the steps of placing a pool of metal solder into a concavity in the terminal onto which an end portion of a thermoplastic insulated conductor is to be soldered, heating the solder and the terminal to at least the eutectic temperature of the solder, placing a mark on the insulation of the conductor a predetermined distance from the end thereof, causing relative sliding axial movement of the insulated conductor into the concavity of the terminal while simultaneously holding the end of the thermoplastic insulation against the edge of the terminal and holding the conductor against the surface of the concavity into which the pool of solder was placed so that heat from the pool of solder and terminal softens the thermoplastic insulation and the relative sliding movement between the conductor and the end of the terminal results in forces which urge the end of the thermoplastic insulation on the conductor to recede from the end of the conductor to expose the surface of the end portion of the conductor as the exposed end portion of the conductor is inserted into the pool of solder in the concavity until the mark on the insulation is a predetermined distance from the end of the terminal to form a soldered connection between the end portion of the conductor and the terminal, placing the tip of a soldering iron against the exposed portion of the conductor during the insertion thereof into the pool of solder to increase the rate of conduction of the heat into the insulated conductor and thus increase the rate of shrink-back of the insulation and the rate at which the connection may be formed, whereby an enlarged, compressed, radially projecting, annular insulating barrier is formed in the end portion of the insulation, wiping the surface of the pool of solder toward the end of the terminal to remove any foreign particles of insulation from the pool of solder, and supporting the insulated conductor until the solder solidifies sufficiently.

References Cited in the file of this patent

UNITED STATES PATENTS

| | | |
|---|---|---|
| 355,611 | Howson | Jan. 4, 1887 |
| 1,640,869 | Armstrong et al. | Aug. 30, 1927 |
| 2,692,422 | Pierce | Oct. 26, 1954 |
| 2,715,764 | Pierce | Aug. 23, 1955 |
| 2,838,593 | Scesa et al. | June 10, 1958 |
| 2,918,519 | Drievers | Dec. 22, 1959 |